United States Patent [19]

Field

[11] Patent Number: 4,501,288

[45] Date of Patent: Feb. 26, 1985

[54] MARINE SPEEDOMETER ANTI-FOULING DEVICE

[76] Inventor: William J. Field, 10305 Bowerbank Rd., Sidney, B.C., Canada, V8L 3L2

[21] Appl. No.: 532,694

[22] Filed: Sep. 16, 1983

[51] Int. Cl.³ ............................................. F16K 11/00
[52] U.S. Cl. ............................... 137/240; 137/625.48; 73/182
[58] Field of Search ................ 137/625.5, 625.69, 237, 137/238, 239, 240, 625.48, 625.25, 625.27, 597, 15; 73/182, 183, 861.65, 861.66, 861.67, 861.68

[56] References Cited

U.S. PATENT DOCUMENTS

| | | | |
|---|---|---|---|
| 2,209,418 | 7/1940 | Overbeke | 137/625.69 |
| 2,362,298 | 11/1944 | Newell | 73/182 |
| 2,606,739 | 8/1952 | Gardner | 137/625.27 |
| 3,327,530 | 6/1967 | Lepird | 73/182 |
| 3,380,298 | 4/1968 | Hanson | 137/237 |
| 4,174,049 | 11/1979 | Bolen | 73/182 |

Primary Examiner—Martin P. Schwadron
Assistant Examiner—John S. Starsiak, Jr.
Attorney, Agent, or Firm—Carver & Co.

[57] ABSTRACT

A valve for controlling purging fluid for marine speedometer lines includes a valve body. The valve body has a bore extending in a longitudinal direction therein, a speedometer port, a pressurized fluid supply port and an impact tube port. The ports are spaced apart in the longitudinal direction and communicate with the bore. A valve spool is slidably received within the bore for reciprocation between first and second positions in the bore. The spool has three spaced apart seals between the bore and the spool. There is a first passageway between the first and second seals and between the spool and the bore. The speedometer port and the impact tube port communicate through the passageway, the pressurized fluid supply port is isolated from the speedometer port and the impact tube port, and the third seal and first seal are on opposite sides of the pressurized fluid supply port, in the first position of the spool. The impact tube port communicates with the pressurized fluid supply port, and the speedometer port is isolated from the impact tube port and the pressurized fluid supply port, in the second position of the spool. A spring biases the spool towards the first position. A button is connected to the spool and projects outwardly from the valve body at one end of the bore for manually moving the spool from the first position to the second position.

9 Claims, 6 Drawing Figures

MARINE SPEEDOMETER ANTI-FOULING DEVICE

BACKGROUND OF THE INVENTION

Field of the Invention

The invention relates to a valve for controlling a purging fluid for marine speedometer lines.

Marine speedometers designed for use in pleasure craft are usually pitot pressure-type instruments. These speedometers are connected by a tube to a sender unit below the waterline of the boat. These sender units are known as impact tubes. The pressure of the water entering the impact tube is transmitted to the speedometer through the flexible tube. Such a marine speedometer is essentially a pressure guage for measuring the pressure of the water which is proportional to the speed of the boat.

It is very common for such speedometers to be rendered inoperative due to vegetation or other debris entering the opening in the impact tube. Once the tube is clogged, the pressure is no longer transmitted to the speedometer. Removing this debris is awkward and usually cannot be accomplished until the boat returns to shore.

Marine speedometers and the like are shown in such earlier U.S. Pat. No. 2,362,298 to Newell, U.S. Pat. No. 3,050,996 to Henderson, U.S. Pat. No. 3,327,530 to Lepird and U.S. Pat. No. 3,349,615 to Finkl.

A similar problem with fouling has been encountered in the pitot tubes of aircraft. U.S. Pat. No. 4,174,049 to Bolen discloses an apparatus for purging pitot tubes of aircraft. The apparatus includes a disposable, replaceable cylinder of compressed gas and a valve. The valve disconnects instruments from the regular pitot tube when the lines are being purged. Another device for purging pitot tubes is disclosed in U.S. Pat. No. 3,380,298 to Hanson. Both of these patents show devices which are far too complex and expensive for practical application in pleasure boats.

SUMMARY OF THE INVENTION

According to the invention, a valve for controlling a purging fluid for marine speedometer lines comprises a valve body with a bore extending in a longitudinal direction therein. The valve body has a speedometer port, a pressurized fluid supply port and an impact tube port. The ports are spaced apart in the longitudinal direction and communicate with the bore. A valve spool is slidably received within the bore for reciprocation between first and second positions in the bore. The spool has three spaced apart seals between the bore and the spool. There is a first passageway between the first and second seals and between the spool and the bore. The speedometer port and the impact tube port communicate through the passageway, the pressurized fluid supply port is isolated from the speedometer port and the impact tube port, and the first seal and the third seal are on opposite sides of the pressurized fluid supply port in the first position of the spool. The impact tube port communicates with the pressurized fluid supply port, and the speedometer port is isolated from the impact tube port and the pressurized fluid supply port, in the second position of the spool. There is means biasing the spool towards the first position. There is button means for manually moving the spool from the first position to the second position. The button means is connected to the spool and projects outwardly from the valve body at one end of the bore.

DESCRIPTION OF THE PREFERRED EMBODIMENTS

Figure 1:
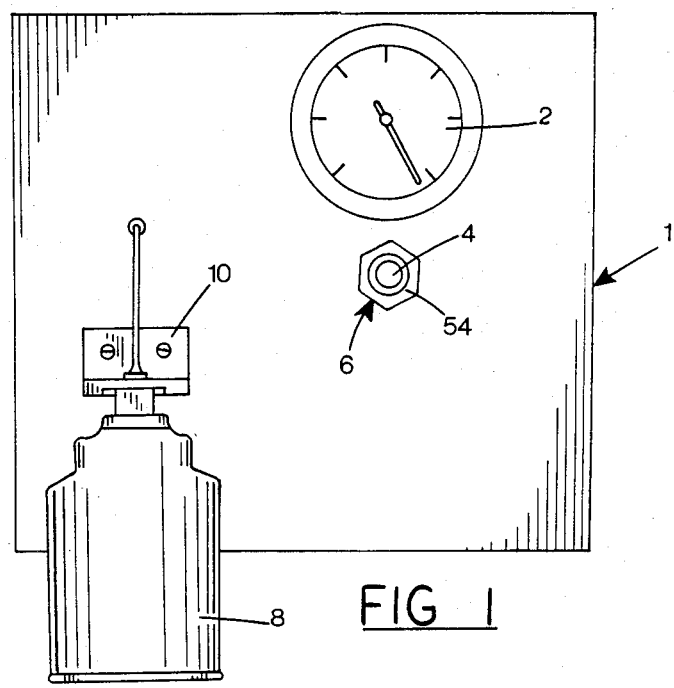
FIG. 1 is an elevation of a typical installation including a marine speedometer, a valve for controlling a purging fluid for the speedometer lines and a supply of compressed gas for supplying the purging fluid.

FIG. 1 illustrates an instrument panel 1 of a boat. Typically this would be a small pleasure craft. A speedometer 2 is mounted on the instrument panel. Below the speedometer is located an operating button 4 of a valve for controlling a purging fluid for the speedometer. The valve is shown generally at 6. The purging fluid in this case is a compressed gas contained within a disposable container 8 connected to a container mount 10.

Figure 2:
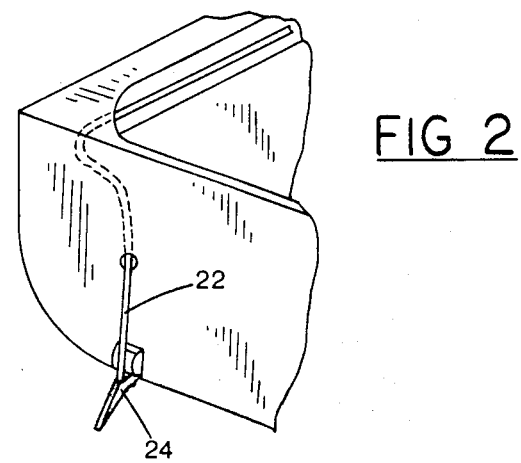
FIG. 2 is an isometric view of a typical impact tube installation on the transom of a boat.
Figure 3:
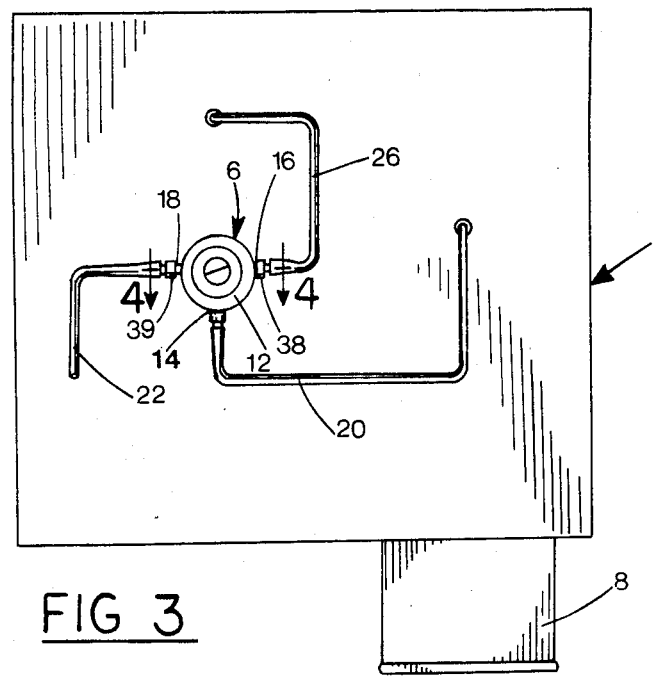
FIG. 3 is a rear elevation of the valve of FIG. 1 showing the conduits connected thereto.

FIG. 3 shows the back side of the instrument panel 1 and the portion of valve 6 extending behind the instrument panel. The valve 6 has a valve body 12 with a pressurized fluid supply port 14, a speedometer port 16, and an impact tube port 18. A metal tube 20 connects port 14 to the disposable container 8 shown in FIG. 1. A line 22 of flexible plastic tubing connects port 18 to impact tube 24 show in FIG. 2. The impact tube is a standard boating accessory and so will not be described in more detail. A line 26 connects speedometer port 16 to the speedometer 2 shown in FIG. 1.

Figure 4:
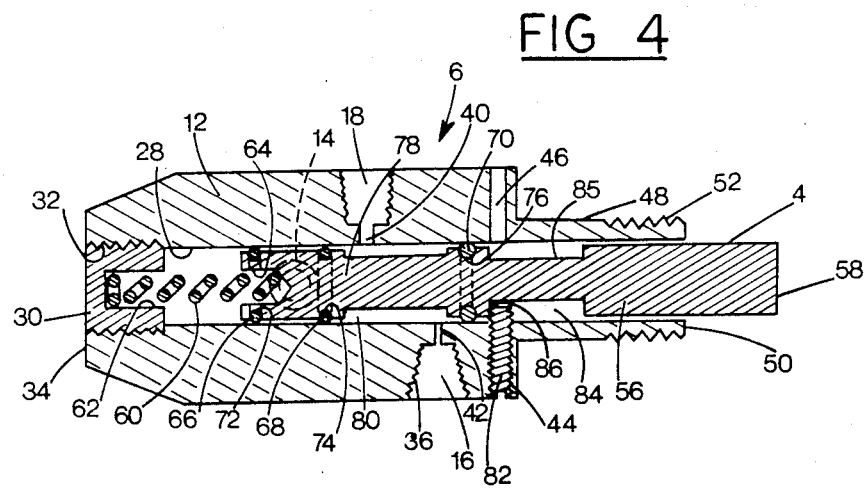
FIG. 4 is a sectional view of the valve along line 4—4 of FIG. 1, showing the valve spool in a first position.
Figure 5:
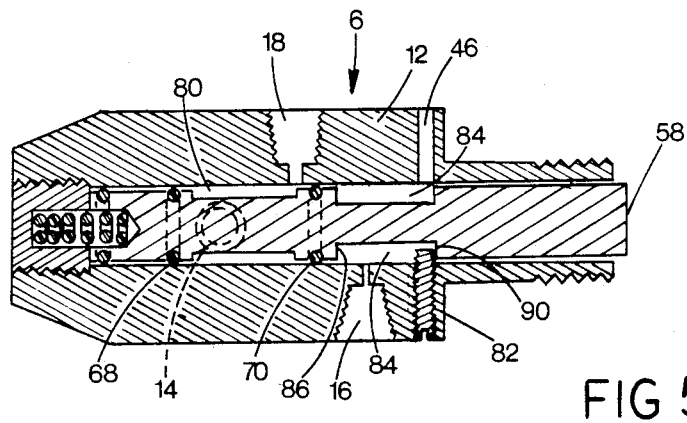
FIG. 5 is a sectional view of the valve showing the valve spool in a second position.

The structure of valve 6 can be appreciated better with reference to the sectional views of FIGS. 4 and 5. FIG. 4 firstly shows the valve in the (5) position for normal operation of the speedometer 2. The valve body 12 is generally cylindrical in shape with a bore 28 extending in a longitudinal direction therein. In this embodiment, the bore 28 extends completely through the valve body. A male threaded fitting 30 is fitted into a corresponding threaded aperture 32 at end 34 of the valve body.

Each of the ports 14, 16 and 18 has a threaded outer portion for receiving a threaded tube connector. For example, port 16 has a threaded outer portion 36 which receives the threaded tube connector 38 shown in FIG. 3. Port 14 has a connector 39 with an internal check valve. Each port also has an inside portion adjacent the bore 28 which communicates with the bore. For example, port 18 has an inside portion 40 and port 16 has an inside portion 42. It may be seen that portion 40 of the impact tube 18 has a cross-sectional extent substantially greater than the cross-sectional extent of the portion 42 of the speedometer port 16. In the preferred embodiment, portion 40 has a cross-sectional area approximately twice that of portion 42.

A smaller threaded bore 44 extends through the valve body 12 to communicate with the longitudinal bore 28. Bore 44 is diametrically aligned with a similar sized unthreaded bore 46 on the opposite side of the valve body.

A stem 48, of reduced diameter, is formed on the valve body adjacent end 50 which is opposite end 34. The outer portion 52 of the stem is threaded to receive a nut 54 shown in FIG. 1. Stem 48 extends through a slightly larger aperture in the instrument panel and the nut 54 is tightened in place to secure the valve to the instrument panel.

It may be observed that bore 28 extends completely through stem 48. A valve spool 56 is slidably received within the bore 28 for reciprocation between the first position shown in FIG. 4 and the second position shown in FIG. 5. The valve spool has an outer end 58 which serves as the button 4 for manually moving the spool from the first position to the second position. The button projects outwardly from the valve body at end 50. The valve spool is resiliently biased towards the position of FIG. 4 by a coil spring 60. The spring has opposite ends received in recesses 62 and 64 of the fitting 30 and the valve spool, respectively.

The valve spool is provided with three spaced apart seals in the form of O-rings 66, 68 and 70 The O-rings are received in circumferential grooves 72, 74 and 76 on the spool. In the position of FIG. 4, it may be observed that O-rings 66 and 68 straddle port 14. These O-rings therefore serve to prevent a flow of pressurized gas from the port 14.

It may also be seen that O-rings 68 and 70 straddle a portion 78 of the spool. Portion 78 has a reduced cross-sectional extent, resulting in an annular passageway 80 between the O-rings 68 and 70 and between the valve spool 56 and valve body 12. Thus, for the position of the valve spool shown in FIG. 4, the impact tube port 18 communicates through the passageway 80 with the speedometer port 16. The passageway 80 permits ports 16 and 18 to communicate, while O-rings 68 and 70 seal the ports from the outside atmosphere. At the same time, O-rings 66 and 68 serve to isolate the pressurized fluid supply port 14 from the other two ports in the position of FIG. 4.

A second passageway 84 between the spool and the valve body is formed by another portion 85 of the spool of reduced cross-sectional extent. A slot headed screw 82 is received in threaded bore 44 and projects part way into the passageway. The screw serves as means for securing the valve spool in the valve body. As may be seen, shoulder 86 formed on the spool contacts the screw 82 to limit travel of the valve spool away from spring 60.

The second position of the valve spool is illustrated in FIG. 5. This position is achieved by pushing on outer end 58 of the valve spool until shoulder 90, on the opposite side of passageway 84 from shoulder 86, contacts screw 82. As may be observed, in this position, passageway 80 between O-rings 68 and 70 is positioned so the impact tube port 18 communicates with the pressurized fluid supply port 14. At the same time, O-ring 70 serves to isolate speedometer port 16 from the other two ports. Thus, a flow of pressurized gas is permitted from port 14 through impact tube port 18 to tube 22 shown in FIG. 3.

In the second position of FIG. 5, passageway 84 is aligned with speedometer port 16. This permits venting of the speedometer through the passageway 84 and the bore 46 to the atmosphere.

Figure 6:
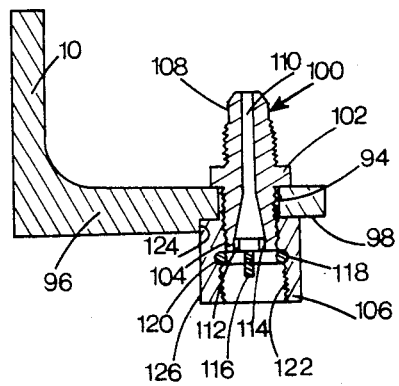
FIG. 6 is a sectional view of the mount for the container of compressed gas.

FIG. 6 illustrates gas container mount 10. The mount is a right angled section member having an aperture 94 near the distal end of horizontal flange 96. A notch 98 is formed in the lower surface of the flange adjacent the aperture. A threaded fitting 100 extends through aperture 94. A hexagonal portion 102 limits the downward movement of the threaded fitting through aperture 94. Fitting 100 has a threaded end 104 projecting downwardly through the aperture. A nut 106 is received on the threaded fitting to secure it in place. The threaded fitting has an upper portion 108 which is shaped for connection to the metal tube 20 as shown in FIGS. 1 and 3. The threaded fitting is hollow, having an interior passageway 110 which communicates outwardly at the top of the fitting and extends to near the bottom thereof. A pair of spaced-apart smaller passageways 112 and 114 communicate outwardly from passageway 110 to the bottom of the fitting. A small stem 116 extends outwardly from the bottom of the fitting between passageways 112 and 114.

Nut 106 has an interior circumferential groove 118 which receives an O-ring 120. The nut 106 has interior threads 122 of such a size as to fit a standard disposable pressurized gas container. These containers are used typically to provide pressurized gas for marine warning horns. Sealing between the gas container and the threaded fitting 100 is achieved by O-ring 120 contacting the top of the nipple on the gas container. At the same time, when the gas container is threaded into nut 122, stem 116 enters the opening on the nipple and opens the valve on the gas container to release the pressurized gas. It may be observed that nut 106 is received within notch 98 of mount 92. A flat side 126 of the nut contacts shoulder 124 of the mount to prevent twisting of the nut when the gas container is screwed into place or unscrewed.

The operation of the apparatus is simple once the installation shown in FIGS. 1-3 is completed. In normal operation, the valve is in the position of FIG. 4 where an escape of gas from the gas cylinder is prevented by O-rings 66 and 68 on opposite sides of port 14 in the bore 28. In this position the speedometer communicates with the impact tube through line 26, speedometer port 16, passageway 80, impact tube port 18 and line 22.

When the impact tube 24 or the impact tube line 22 become clogged by debris or the like, this will be indicated by disfunction of the speedometer. When this occurs, the boater simply pushes the button formed by the outer end 58 of valve spool 56. This moves valve spool 56 to the second position of FIG. 5. This achieves two things. Firstly, the speedometer is isolated from impact tube line 22 and vented to the atmosphere. This occurs because O-ring 70 is shifted to a position between speedometer port 16 and impact tube port 18. At the same time, the speedometer can vent to the atmosphere through passageway 84 and bore 46. This prevents damage to the speedometer which would be caused by the pressurized gas in the gas container. Secondly, the gas container 8 communicates with line 22 and the impact tube in this position. The gas passes from the container, into line 20, through port 14 and passageway 80 to impact tube port 18. From here, the pressurized gas passes through impact tube line 22 and drives water that has entered the line towards the impact tube 24 to blow any debris out of the line and impact tube. This clears the obstruction.

The valve is designed to prevent damage to the speedometer when the valve spool returns to the position of FIG. 4 under the action of spring 60. As the spool returns to this position, a certain amount of pressurized gas is caught between O-rings 68 and 70 within passageway 80. However, as disclosed above, inside portion 40 of port 18 has approximately twice the cross-sectional area of inside portion 42 of port 16. Therefore, the pressurized gas has a tendency to flow outwardly through port 18 rather than through port 16 to the speedometer.

The check valve in connector 39 of port 14 stops water from entering valve 6 when gas container 8 is empty or removed from mount 10.

I claim:

1. A valve for controlling a purging fluid for marine speedometer lines, the valve comprising:
   a valve body with a bore extending in a longitudinal direction therein, a speedometer port, a pressurized fluid supply port and an impact tube port, the ports being spaced apart in the longitudinal direction and communicating with the bore;
   a valve spool slidably received within the bore for reciprocation within the bore, the spool having three spaced apart seals between the bore and the spool and a first passageway between first and second said seals and between the spool and the bore; the spool having a first position wherein the speedometer port and the impact tube port communicate through the passageway, the pressurized fluid supply port is isolated from the speedometer port and the impact tube port, and a third said seal and the first said seal are on opposite sides of the pressurized fluid supply port the spool having a second position wherein the impact port communicates with the pressurized fluid supply port, and the speedometer port is isolated from the impact tube port and the pressurized fluid supply port;
   means biasing the spool towards the first position;
   button means for manually moving the spool from the first position to the second position, the button means being connect to the spool and projecting outwardly from the valve body at one end of the bore; and means for venting the speedometer when the spool is in the second position, the means for venting comprising an opening in the valve body and a second passageway in the spool extending from the opening to the speedometer port in the second position of the spool.

2. A valve as claimed in claim 1, further comprising means for mounting the valve on an instrument panel so the button means projects outwardly through an aperture in the panel.

3. A valve as claimed in claim 2, wherein the means for mounting includes a male threaded portion of the valve body adjacent the button means.

4. A valve as claimed in claim 1, wherein the impact tube port and the speedometer port have portions adjacent the bore communicating with the bore, the portion of the impact tube port having a cross-sectional extent substantially greater than the cross-sectional extent of the portion of the speedometer port.

5. A valve as claimed in claim 1 wherein the means biasing comprises a coil spring between the spool and the end of the valve body opposite the one end.

6. A valve as claimed in claim 1, wherein the passageway comprises a section of the valve spool of reduced cross-sectional extent between the two seals.

7. A valve as claimed in claim 1, further comprising means for securing the valve spool in the valve body, the means for securing comprising a screw extending through another opening in the valve body into the second passageway in the spool, the second passageway being sufficiently long to permit the spool to move between the first and second positions.

8. A valve as claimed in claim 1, in combination with a supply of compressed gas connected to the pressurized fluid supply port, a conduit connected to the speedometer port for connecting the valve to a marine speedometer, and a conduit connected to the impact tube port for connecting the valve to an impact tube unit below a boat's waterline.

9. A combination as claimed in claim 8, wherein the supply of compressed gas is a disposable container of compressed gas.

* * * * *